United States Patent [19]

Parker

[11] Patent Number: 4,606,616

[45] Date of Patent: Aug. 19, 1986

[54] MICROSCOPES

[76] Inventor: Douglas I. Parker, 316 Youngstown-Kingsville Rd., Vienna, Ohio 44473

[21] Appl. No.: 495,706

[22] Filed: May 18, 1983

[51] Int. Cl.$^4$ ............................................. G02B 21/06
[52] U.S. Cl. ...................................... 350/521; 350/526
[58] Field of Search ................................. 350/236–237, 350/509–510, 521, 523–529, 603; 356/277, 324

[56] References Cited

U.S. PATENT DOCUMENTS

| 2,971,080 | 2/1961 | Boughton | 350/603 |
| 3,650,597 | 3/1972 | Nothnagle | 350/526 |
| 4,106,851 | 8/1978 | Considine et al. | 350/526 |
| 4,470,670 | 9/1984 | Ingle et al. | 350/523 |

FOREIGN PATENT DOCUMENTS

| 439662 | 1/1927 | Fed. Rep. of Germany | 350/526 |
| 855915 | 11/1952 | Fed. Rep. of Germany | 350/326 |
| 200777 | 7/1923 | United Kingdom | 350/525 |
| 754667 | 8/1956 | United Kingdom | 350/529 |

*Primary Examiner*—William H. Punter
*Attorney, Agent, or Firm*—Yount & Tarolli

[57] ABSTRACT

A microscope having a first mirror located below its stage, such mirror being rotatable and bodily shiftable to selected positions to reflect light at various angles with respect to the optical axis so as to provide for various degrees of dark-field illumination of a specimen on the stage. Said mirror is also shiftable to a position to reflect light coincident with the optical axis to provide for bright-field illumination. This mirror has a mounting which is slidable within a horizontal slot in a side wall of the base of the microscope, the mounting permitting rotation of the mirror at any position along the slot. A second mirror, which may be used to spotlight the specimen being examined, is carried by a mounting block on which the lens body is supported, the block being vertically movable for the purpose of focusing the lens system. The second mirror is pivotal about a horizontally-disposed axis and adapted to reflect rays from a light source onto a specimen on the stage. The first mirror may be shifted to a position wherein it limits light rays only in a direction toward the second mirror.

7 Claims, 11 Drawing Figures

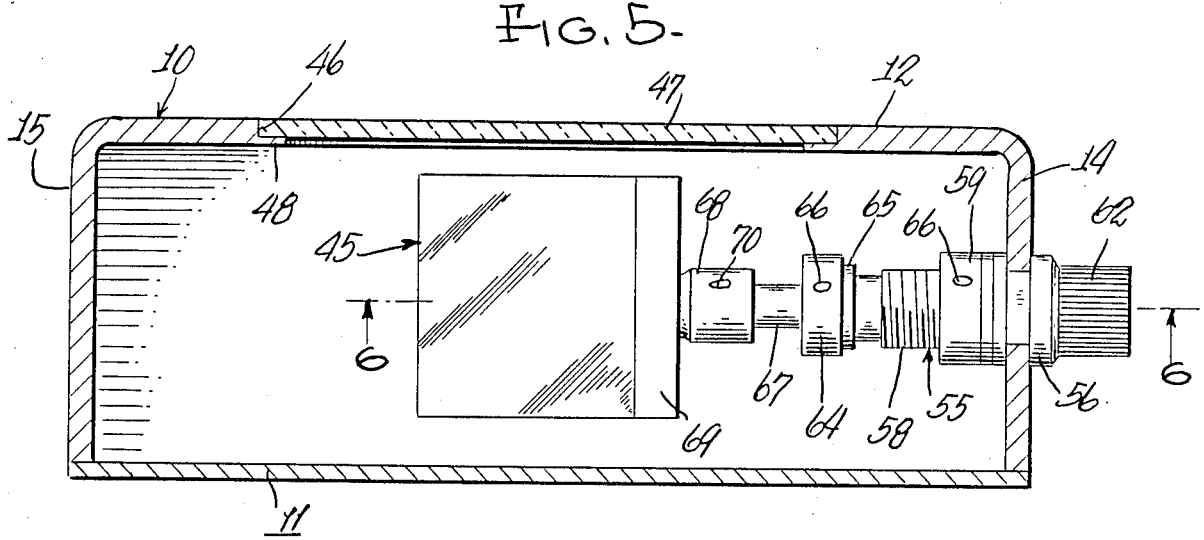
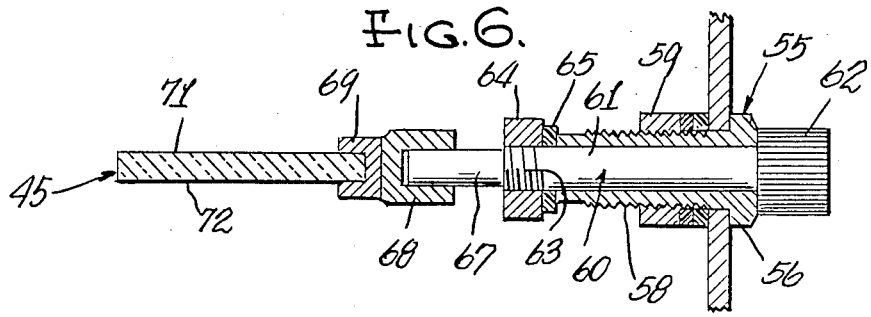
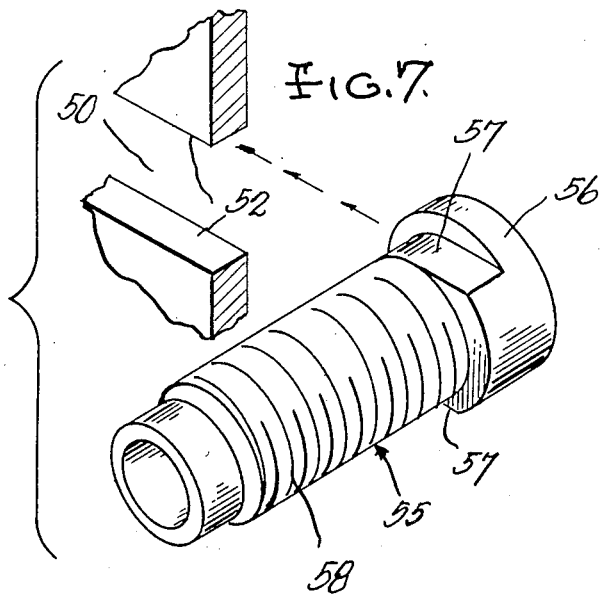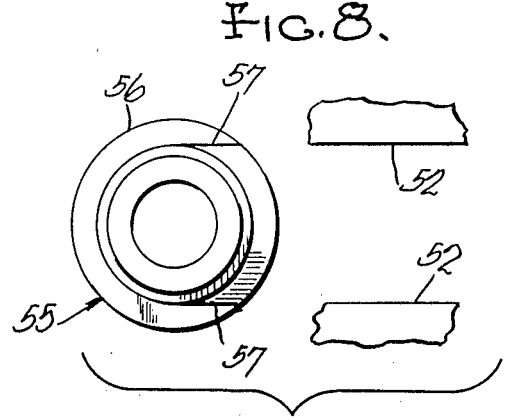

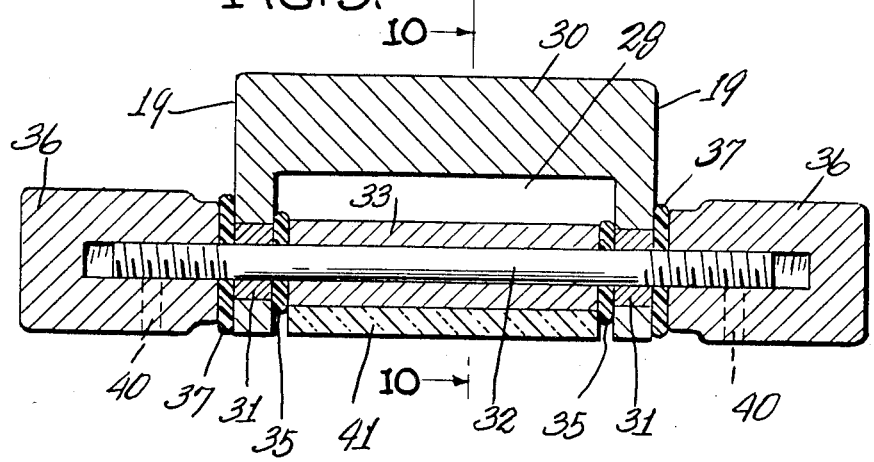
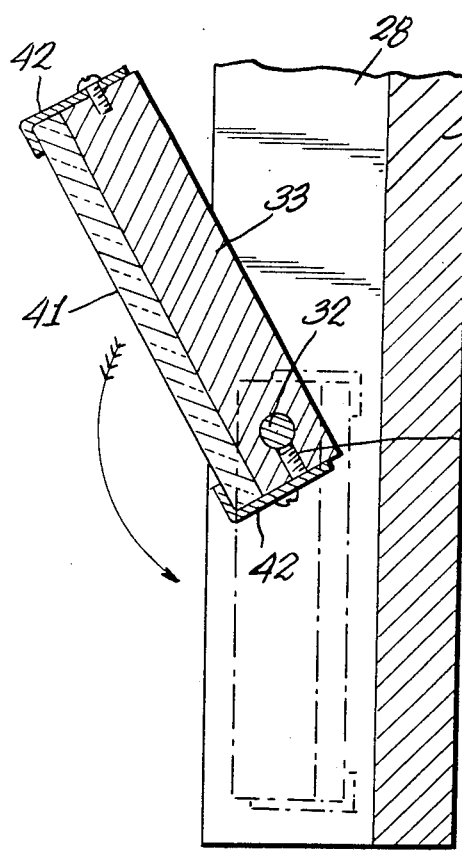
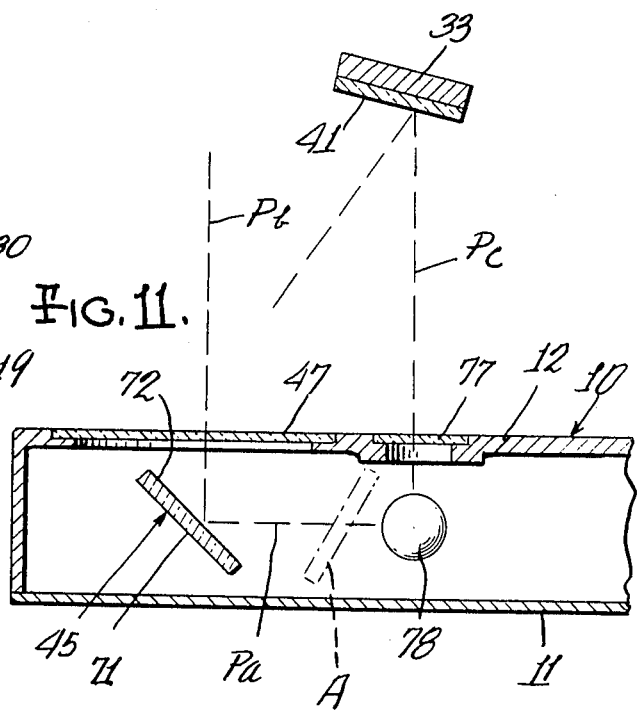

MICROSCOPES

BACKGROUND AND SUMMARY

Considered most pertinent of the prior art are the U.S. patents issued to Rehm, U.S. Pat. No. 3,490,828, and Nothnagle, U.S. Pat. No. 3,650,597.

The Rehm patent discloses a microscope having an illumination system which includes a fixed mirror arranged in spaced relationship to a light source below the stage, and further including a mirror pivotally mounted on a carrier so that it may be oriented along the axis of the light source in order to reflect the light either to the fixed mirror or directly to the specimen being viewed by oblique side lighting. The Rehm system takes up valuable space at the front of the microscope for the rotatable mirror and requires delicate alignment of the fixed mirror.

The Nothnagle patent discloses a microscope having an illumination system which includes a mirror and a fixed light source. The mirror is carried by a mounting which may be shifted to one of two positions on a wall forming part of the microscope base. In one position the mirror reflects rays from the light source so as to be coincident with the optical axis of the objective for bright-field illumination of the subject being viewed. In the other position the mirror reflects rays from the light source so as to diverge from the optical axis of the objective leaving only such rays to enter it as may have been caused to reflect or scatter by details of the subject being viewed.

Since the mirror in the Nothnagle patent is movable to only two positions, its usefulness for dark-field illumination is limited. Further, movement of the mirror from one position to the other required manual disengagement of parts to permit such movement and reengagement of parts to hold the mirror in its shifted position, and great care had to be exercised to make sure the mirror was correctly seated in its adjusted position. Also, to change mirror position, the work had to be performed from beneath the microscope base.

My invention overcomes the above-noted problems of the prior art by providing construction whereby the mirror may be easily moved to any one of a number of positions to provide for bright-field illumination or varying degrees of dark-field illumination. The mirror is carried by a mounting that smoothly slides horizontally along the defining walls of a slot in a side wall of the microscope base. The mounting also permits the mirror to be rotated about a horizontal axis which is transverse to the sliding movement of mirror mounting.

A second mirror is carried by a mounting block in which the lens body is supported. The mounting block is movable vertically of the frame of the microscope by well-known focusing mechanism. The second mirror is pivotally mounted on the supporting block to catch rays emanating from a light source that is disposed within the microscope base to concentrate light at any selected position along the stage.

A single light source serves to beam rays to both mirrors and the first-named mirror may be moved horizontally to a position adjacent to the light source to block light rays and thereby make the microscope inoperable for both bright-field and dark-field illumination.

DESCRIPTION OF THE DRAWINGS

In the drawings accompanying this specification, and forming a part of this application, there is shown, for purpose of illustration, an embodiment which my invention may assume, and in these drawings:

FIG. 4 is a vertical sectional view corresponding to the line 4—4 of FIG. 1, FIG. 5 is an enlarged sectional view corresponding to the line 5—5 of FIG. 1, FIG. 6 is a horizontal sectional view corresponding to the line 6—6 of FIG. 5, FIG. 7 is an enlarged separated perspective view, showing a sleeve and its cooperation with the walls of a slot formed in a side wall of the microscope base, FIG. 8 is an end view of the sleeve, offset from a fragmentary part of the side wall, FIG. 9 is an enlarged sectional view corresponding to the line 9—9 of FIG. 1, FIG. 10 is a vertical sectional view corresponding to the line 10—10 of FIG. 9, and FIG. 11 is a somewhat schematic view showing the versatility of my improved microscope.

DESCRIPTION OF THE PREFERRED EMBODIMENT

Figure 1:
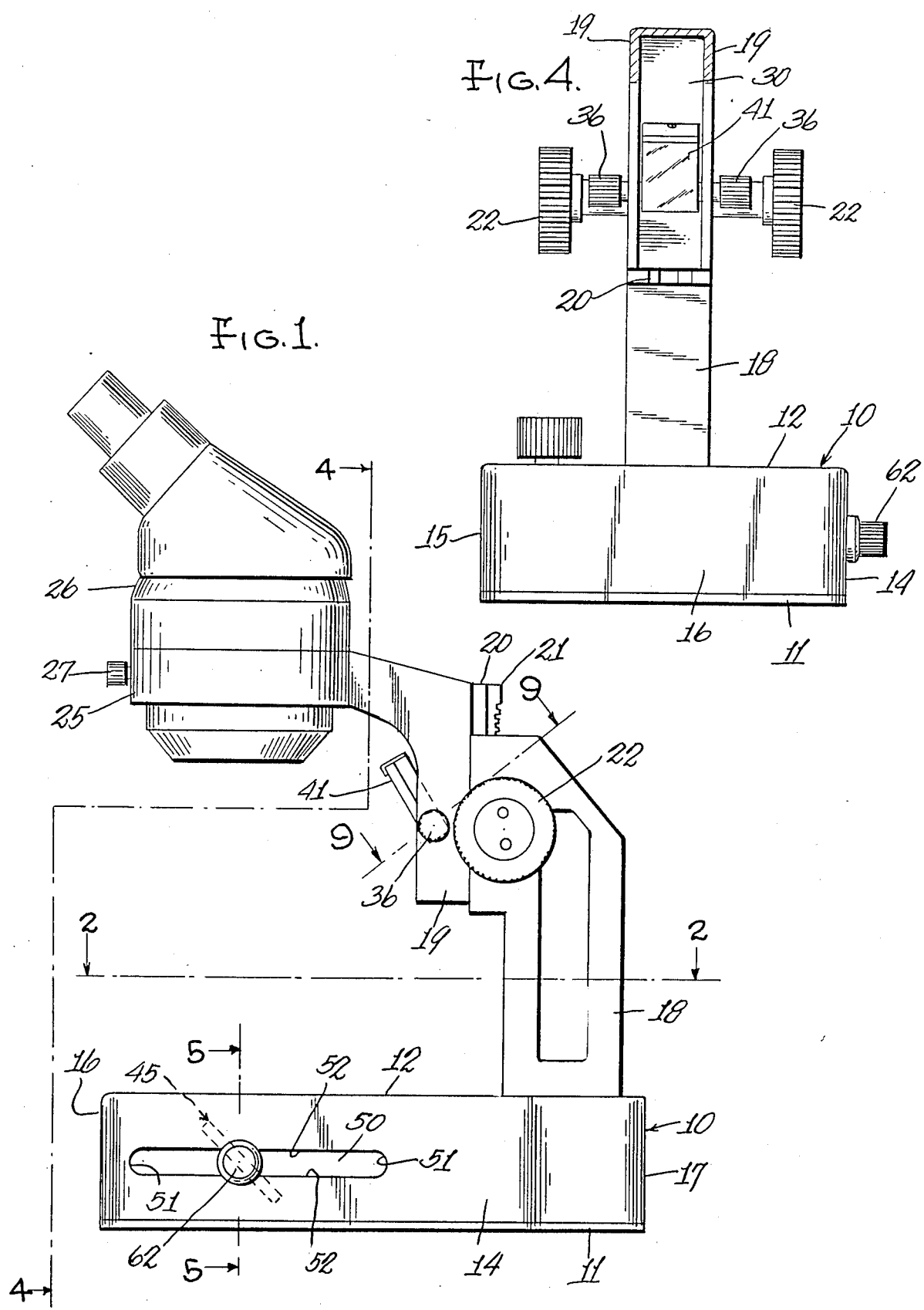
FIG. 1 is a side elevational view of a microscope, showing a preferred embodiment of my invention.

The microscope herein disclosed comprises a hollow housing 10, which is open at the bottom but adapted to be closed by a removable cover 11. The housing is somewhat rectangular in plan view and has a top wall 12 opposite side walls 14,15, and opposite end walls 16–17. A supporting arm 18 is rigidly connected to the housing and extends upwardly from the upper wall thereof.

A focusing block 19 on which the lens body is supported for movement therewith along the optical axis, is mounted on the arm 18 for vertical adjustment and the construction for effecting vertical movement of the block 19 may be of conventional form. A well-known form comprises a dove-tail slide joint 20 between the focusing block and the arm 18 and a gear rack 21 meshing with a gear (not shown) rotatably carried in bearings which are mounted in the arm. Adjustment wheels 22 extend from opposite sides of the arm 18 for manual manipulation to effect vertical movement of the focusing block in well-known manner.

A ring-like pod holder 25 extends laterally from the upper end of the focusing block and is adapted to receive any one of a number of different types of pod bodies 26. A bolt having a knurled head 27 holds the body in selected position.

The focusing block 19 is generally U-shaped in cross section, as best seen in FIG. 9, to form a vertically-elongated cavity 28 in which a mirror is disposed for spot light illumination of the specimen being examined. As seen in FIGS. 9 and 10, the cavity 28 is formed by side walls joined by a rear wall 30. Axially aligned holes are formed in the side walls to closely receive bearing sleeves 31 in which a cross shaft 32 is journalled. A block 33 of metal or rigid plastic has a cross opening near its lower end to pass the shaft 32, and a set screw 34 holds the block for rotation with the shaft.

The width of the block is slightly less than the distance between the facing inner surfaces of the side walls 29,29 so that nylon O-rings 35 may be interposed for bearing purposes. The ends of the shaft 32 are threaded and extend outwardly of the side walls. Round nuts 36, with fluted peripheral surfaces, are threaded on the respective ends of the shaft 32, and nylon O-rings 37 are interposed between each nut and the adjoining surface of a side wall 29 for bearing purposes. The nuts are tightened on the shaft ends until sufficient friction is generated to hold the block 33 in any adjusted position and yet permit easy rotation of the block. Set screws 40 hold the nuts in adjusted position.

A mirror 41 is carried by the block at its forward face, the mirror having a pheripheral size corresponding to that of the block. The mirror may have its rear face cemented to the front face of the block, or may be held in position by toe plates 42 at the upper and lower ends of the block. As seen in FIG. 10, the block may be rotated to the dot-dash position wherein it and the mirror are fully disposed within the cavity 28 for protection during shipping, the mirror being disposed innermost of the cavity so as to be protected by the block 33.

Figure 2:
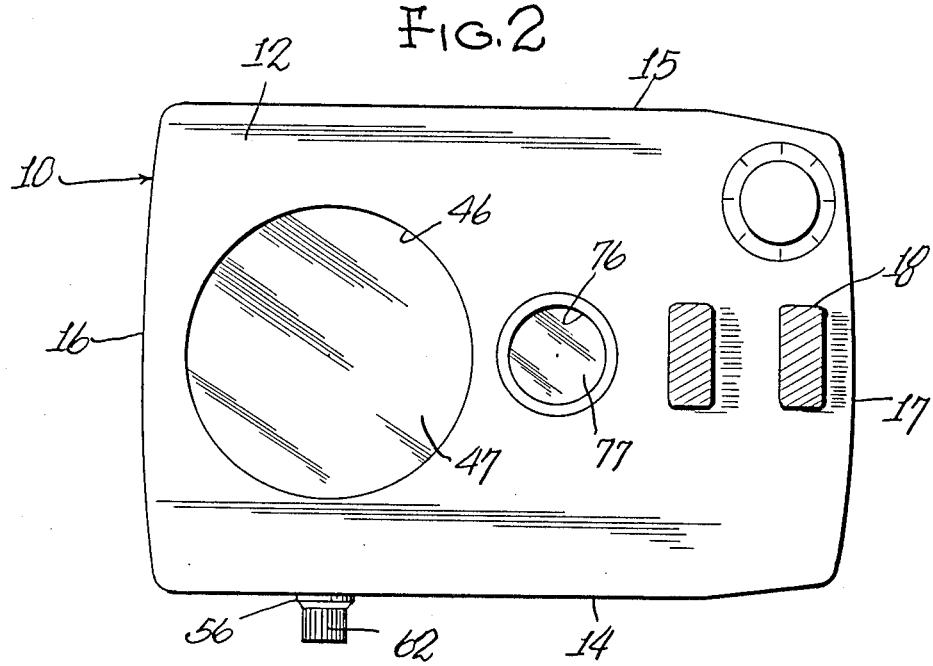
FIG. 2 is a horizontal sectional view corresponding to the line 2—2 of FIG. 1.

A mirror 45 is disposed within the base and is adjustable to provide for either bright-field or dark-field illumination of the specimen on the stage. In the illustrated embodiment, the top wall 12 of the microscope base has a large, circular hole 46 therein (see FIGS. 2, 3 and 5) and a plain glass disc 47 is supported within the confines of the hole 46 and rests on a circular ledge 48. The subject to be examined is disposed upon the top surface of the glass disc.

The mirror 45 is mounted for horizontal movement between two extreme positions, and for rotation in any position. In the disclosed embodiment the side wall 14 (FIG. 1) has an elongated slot 50 formed therein, the ends of the slot being defined by half-round surfaces 51 (see especially FIG. 1). The upper and lower surfaces 52 of the slot are flat and parallel. A tubular fitting 55 (see FIG. 7) is disposed crosswise of the slot 50 and has a circular head 56 exteriorly of the wall 14. The head is ground to provide oppositely-disposed flat surfaces 57 which are spaced to closely fit the flat surfaces 52 of the slot to establish a sliding fit therebetween.

Inward of the head the tubular fitting 55 has a threaded section 58 to receive a nut 59. Nylon discs are disposed on the threaded section 58 and are clamped between the nut 59 and the inner surface of the base wall 14. The nut is tightened to firmly hold the fitting 55, and parts carried thereby, against sagging about the cantilever support, yet to permit smooth sliding of the fitting 55 along the slot 50.

A shaft 60 (see FIG. 6) extends through the tubular fitting, the shaft having an intermediate portion 61 for bearing fit with the interior wall of the fitting and a circular head 62 disposed exteriorly of the fitting and the base side wall 14. The head is fluted to provide a gripping surface for rotating the shaft. The end of the intermediate portion has screw threads 63 to receive a round nut 64 and a nylon disc 65 is disposed between the nut and the terminal end of the fitting 55. The nut is tightened sufficiently to firmly hold the shaft 60 in place but yet permit smooth rotation of the shaft. Set screws 66 hold the nuts 59 and 64 in adjusted position.

The shaft 60 has an inner end 67 of a slightly reduced diameter and this end is received in a socket 68 which is firmly connected to a U-shaped support 69. A set screw 70 holds the socket 68 on the shaft end 67. The mirror 45 is flat and rectangular in shape and has one edge portion held within the support 69 in any suitable manner, such as by cement. The mirror has one side surface 71 that is a true reflecting surface and an opposite side surface 72 that is of a cloudy nature, for a purpose to appear.

Figure 3:
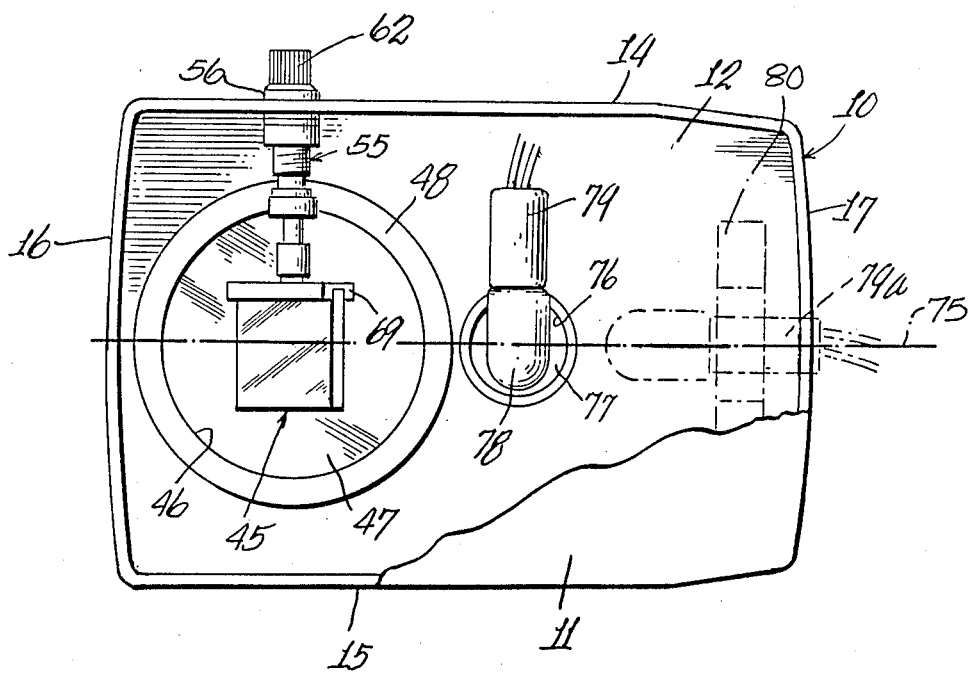
FIG. 3 is a plan view looking from the bottom of the microscope.

As suggested in FIG. 3 the mirror 45 is mounted for movement along the longitudinal centerline 75 of the base 10 and diametrically of the circular opening 46 in the top wall 12. A second, smaller opening 76 is formed in the top wall, behind the opening 46 and also on the centerline 75. A glass lens 77 is held within the opening 76, in line with an electric bulb 78, removably carried by a socket 79. The socket is supported in any suitable manner within the base to extend crosswise thereof. The bulb may be either adapted for a 120-volt source or a 12-volt source, depending upon preference and conditions.

As shown in FIG. 11, the light rays from the bulb 78 may pass along a path Pa to strike the cloudy side 72 of the mirror and be reflected upwardly along the optical axis Pb of the microscope, for bright-field illumination. The mirror may be rotated to present the reflecting side 71 of the mirror to the light source, and the mirror may be shifted along the slot 50 so that the reflected rays are at an angle to the optical axis Pb of the microscope for dark-field illumination.

If desired, the mirror 45 may be shifted to a position A shown in dotted lines so as to block light rays from the bulb and limit such rays to upward direction along the line Pc to the mirror 41, to be in turn directed to highlight a specimen on the glass 47. Since the focusing block 19 is adjusted vertically for various subjects being examined, it will be necessary to adjust the inclination of the mirror 41 to spot the light on the subject.

In some cases the mirror 41 may not be required and therefore the lens 77 and opening therefore may be omitted. The light source may in such case be moved as shown in dot-dash lines in FIG. 3 wherein the socket 79a extends through an opening in the rear wall 17 and is clamped in position by means of a clamp 80 of well-known construction.

I claim:

1. A microscope including a housing having a top wall, a first opening in said top wall in which a glass stage is supported said stage being adapted to support a specimen to be examined, a supporting arm fixed to and extending upwardly from said top wall and a focusing block mounted on said supporting arm for adjustment toward and away from said top wall, a lens body carried by said focusing block and movable therewith along an optical axis which is substantially perpendicular to and centrally of said stage, and a second opening in said top wall adjacent to said first opening, the improvement comprising:

a first mirror within said housing and mounted for bodily movement below said stage and along a horizontal path, said first mirror being rotatable about an axis transverse to said horizontal path, a light source within said housing and adapted to emit light rays along said horizontal path and also along a vertical path up and through said second opening, and a second mirror carried by said focusing block and adapted to receive light rays passing along said vertical path and reflect the same downwardly and onto said stage, said second mirror being swingable about a horizontal pivot to direct light to any selected position on said stage, said first mirror being movable along its horizontal path to a position adjacent to said light source, and being rotatable in such position to block the passage of light rays along said horizontal path.

2. The construction according to claim 1 wherein said housing has a side wall extending downwardly from said top wall, said first mirror being supported on said side wall.

3. The construction according to claim 2 wherein said side wall has an elongated slot and said mirror is supported by a tubular fitting which is slidable along said slot.

4. The construction according to claim 3 wherein a shaft is journalled within said tubular fitting, said shaft having a head disposed exteriorly of said housing for manual rotation, and said shaft having an end disposed interiorly of said housing and supporting said first mirror.

5. A microscope having a stage adapted to support a specimen to be examined and an optical axis through said stage comprising illumination means for directing light along a path transverse to said optical axis, and a mirror for reflecting the light upwardly from said path to the stage, said mirror having a first side for reflecting light for dark field illumination and a second side for reflecting light for bright field illumination of a specimen supported by the stage, support means for said mirror comprising first support means rotatably supporting said mirror centrally in said light for rotation about a central mirror axis extending transversely of said path for adjusting the angle of light reflected from said path toward said stage and for selectively effecting reflection with either the first or second side of said mirror and second support means cooperating with said first support means to support said mirror for displacement in a direction parallel to and along said path for selectively reflecting light towards said stage from various positions along the path of light including a first position at said optical axis and a multiplicity of positions displaced therefrom.

6. A microscope as defined in claim 5 in which said first and second support means comprises cooperating slide elements mounting said first support means on said second support means for sliding movement along said path.

7. A microscope as defined in claim 5 wherein said path of light is perpendicular to said optical axis and to said mirror axis at its said first position and multiplicity of positions and said first and second support means comprising cooperating elements supporting said mirror for continuously variable positioning along said path in opposite directions from said optical axis.

* * * * *